United States Patent
Jo et al.

(10) Patent No.: US 8,473,811 B2
(45) Date of Patent: Jun. 25, 2013

(54) MULTI-CHIP MEMORY SYSTEM AND RELATED DATA TRANSFER METHOD

(75) Inventors: Keun Soo Jo, Hwaseong-si (KR); Dong Yang Lee, Yongin-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 312 days.

(21) Appl. No.: 12/917,683

(22) Filed: Nov. 2, 2010

(65) Prior Publication Data

US 2011/0126066 A1      May 26, 2011

(30) Foreign Application Priority Data

Nov. 25, 2009 (KR) .......................... 10-2009-0114684

(51) Int. Cl.
*H03M 13/00* (2006.01)
(52) U.S. Cl.
USPC .......................................................... 714/763
(58) Field of Classification Search
USPC .................. 714/6.2, 6.21, 18, 25, 30, 42, 56, 714/762–766, 774, 798
See application file for complete search history.

(56) References Cited

U.S. PATENT DOCUMENTS

| | | | |
|---|---|---|---|
| 6,405,332 | B1 | 6/2002 | Bando et al. |
| 7,266,664 | B2* | 9/2007 | Higuchi et al. ............... 711/173 |
| 7,281,101 | B2* | 10/2007 | Mizushima et al. ........... 711/163 |
| 7,843,758 | B2* | 11/2010 | Byeon ....................... 365/230.05 |
| 7,904,638 | B2* | 3/2011 | Adachi ......................... 711/103 |
| 2002/0120820 | A1* | 8/2002 | Higuchi et al. ............... 711/154 |
| 2005/0162929 | A1* | 7/2005 | Shiota et al. ............. 365/185.29 |
| 2006/0053246 | A1* | 3/2006 | Lee ................................ 711/100 |
| 2007/0091678 | A1* | 4/2007 | Kato et al. ............... 365/185.09 |
| 2008/0189466 | A1 | 8/2008 | Hemmi |
| 2009/0132875 | A1* | 5/2009 | Kitahara et al. .............. 714/721 |
| 2011/0022928 | A1* | 1/2011 | Honda .......................... 714/763 |

FOREIGN PATENT DOCUMENTS

| | | |
|---|---|---|
| JP | 11338782 A | 12/1999 |
| JP | 2008134809 A | 6/2008 |
| JP | 2008191966 A | 8/2008 |

* cited by examiner

*Primary Examiner* — Nadeem Iqbal
(74) *Attorney, Agent, or Firm* — Volentine & Whitt, PLLC

(57) ABSTRACT

A multi-chip memory system comprises source and target memory devices, a memory controller configured to control operations of the source and target memory devices, and a data bus configured for data transfer of the memory controller and the source and target memory devices. The memory controller controls the source memory device to perform a read operation to output data to the data bus. Concurrently, the memory controller controls the target memory device to store the data from the data bus.

20 Claims, 15 Drawing Sheets

MULTI-CHIP MEMORY SYSTEM AND RELATED DATA TRANSFER METHOD

CROSS-REFERENCE TO RELATED APPLICATIONS

This application claims priority under 35 U.S.C. §119 to Korean Patent Application No. 10-2009-0114684 filed on Nov. 25, 2009, the disclosure of which is hereby incorporated by reference in its entirety.

BACKGROUND

Embodiments of the inventive concept relate generally to electronic memory technologies. More particularly, embodiments of the inventive concept relate to multi-chip memory systems and methods of transferring data between memory devices of multi-chip memory systems.

Nonvolatile memory is a type of memory that retains stored data when disconnected from power. One popular form of nonvolatile memory is flash memory, which can be found in a wide range of modern electronic devices, such as computers, portable memory drives, home electronics, cellular phones, and digital cameras, to name but a few.

Most flash memories come in one of two cell array configurations, namely, a NAND flash configuration, and a NOR flash configuration. Flash memories with these two configurations are referred to as NAND flash memory and NOR flash memory, respectively.

In NOR flash memories, memory cells are independently connected to corresponding bitlines and wordlines. Due to this organization, NOR flash memories tend to have relatively efficient access timing. In NAND flash memories, memory cells are arranged in series between a bitline and a common source line so that multiple memory cells are accessed through a common pathway. Due to this organization, NAND flash memories tend to have a relatively high level of integration.

A plurality of memory devices can be integrated in a single memory system to provide a large amount of data storage. A memory system comprising multiple memory chips is referred to as a multi-chip memory system.

SUMMARY

Embodiments of the inventive concept provide multi-chip memory systems capable of performing direct data transfer between memory devices, and methods of operating the multi-chip memory systems. In some embodiments, the direct data transfer improves the performance of the multi-chip memory systems.

According to an embodiment of the inventive concept, a multi-chip memory system comprises first and second nonvolatile memory devices, a memory controller configured to control the first and second nonvolatile memory devices, and a data bus configured to transfer data between the memory controller and the first and second nonvolatile memory devices. The memory controller controls the first and second nonvolatile memory devices simultaneously to perform a first operation to transfer data from the first nonvolatile memory device to the data bus, and a second operation to transfer the data from the data bus to the second nonvolatile memory device, and wherein the memory controller simultaneously activates enable signals of both the first and second nonvolatile memory devices during at least one of the first and second operations.

In certain embodiments, the first and second nonvolatile memory devices have shared access to the data on the data bus.

In certain embodiments, the data is transferred from the first nonvolatile memory device to the second nonvolatile memory device without passing through the memory controller.

In certain embodiments, the memory controller is configured to generate a local write command and a read control signal to control data transfer between the first and second nonvolatile memory devices.

In certain embodiments, the first nonvolatile memory device outputs data in response to the read control signal, and the second nonvolatile memory device stores the data in response to the read control signal upon receiving the local write command.

In certain embodiments, the memory controller comprises an error correcting circuit configured to detect an error in the data transferred between the first and second nonvolatile memory devices.

In certain embodiments, the data is re-transferred between the first and second nonvolatile memory devices in response to the error correcting circuit detecting an error in the data.

In certain embodiments, in response to the error correcting circuit detecting an error in the data, the error is corrected to produce error corrected data, and the error corrected data is transmitted to the second nonvolatile memory device through the memory controller.

In certain embodiments, each of the first and second nonvolatile memory devices comprises a data strobe signal generator configured to receive a strobe signal to indicate data input, and to generate a strobe signal to indicate data output. The data strobe signal generator adjusts a phase of the data strobe signal to a predetermined offset value during direct data transfer between the first and second nonvolatile memory devices.

In certain embodiments, the second nonvolatile memory device receives the local write command and, upon receiving the local write command, adjusts a received read data strobe signal input to have a same phase as a write data strobe signal, and stores data according to the adjusted read data strobe signal.

According to an embodiment of the inventive concept, a method is provided for performing data transfer in a multi-chip memory system comprising first and second nonvolatile memory devices, a memory controller, and a data bus. The method comprises (a) controlling the first nonvolatile memory device to output data to the data bus, (b) controlling the second nonvolatile memory device to receive the data output by the first nonvolatile memory device, (c) providing a control signal to the first and second nonvolatile memory devices, and (d) controlling the second nonvolatile memory device to store the data. The first and second nonvolatile memory devices are simultaneously enabled so that the second nonvolatile memory device receives the data from the data bus as the first nonvolatile memory device outputs the data to the data bus.

In certain embodiments, the control signal is a read control signal.

In certain embodiments, the control signal is a write control signal.

In certain embodiments, the method further comprises detecting an error in the data output from the first nonvolatile memory device.

In certain embodiments, the method comprises, upon detecting an error in the data output from the first nonvolatile memory device, controlling the first nonvolatile memory device to output data to the data bus, repeating (a)-(d).

In certain embodiments, the method further comprises, upon detecting an error in the data output from the first nonvolatile memory device, correcting the error to produce corrected data, and storing the corrected data in the second nonvolatile memory device.

In certain embodiments the control signal is a data strobe signal.

In certain embodiments, the method further comprises adjusting a phase of the data strobe signal to a predetermined offset value by operation of the first or second nonvolatile memory device.

According to another embodiment of the inventive concept, a method is provided for performing data transfer in a multi-chip memory system comprising first and second nonvolatile memory devices, and a data bus connected to the first and second nonvolatile memory devices. The method comprises transferring data from the first nonvolatile memory device to the second nonvolatile memory device by simultaneously enabling the first and second nonvolatile memory devices, and operating the first nonvolatile memory device to present the data on the data bus while operating the second nonvolatile memory device to sense the data from the data bus.

In certain embodiments, the method further comprises transmitting a control signal simultaneously to the first and second nonvolatile memory devices to control the data transfer.

BRIEF DESCRIPTION OF THE DRAWINGS

The drawings illustrate selected embodiments of the inventive concept. In the drawings, like reference numbers indicate like features.

DETAILED DESCRIPTION OF EMBODIMENTS

Embodiments of the inventive concept are described below with reference to the accompanying drawings. These embodiments are presented as teaching examples and should not be construed to limit the scope of the inventive concept.

In the description that follows, the term "and/or" encompasses any and all combinations of one or more of the associated listed items. Also, where one part (or element, device, etc.) is referred to as being "connected/coupled" to another part (or element, device, etc.), the former may be "directly connected" to the latter, or "indirectly connected" to the latter through at least one intervening part (or element, device, etc.).

Terms of a singular form can include plural forms unless otherwise specified. Also, the terms "include," "comprise," "including," or "comprising," indicate the presence of certain feature(s), such as a property, a region, a fixed number, a step, a process, an element and/or a component but they do not exclude other properties, regions, fixed numbers, steps, processes, elements and/or components.

Figure 1:
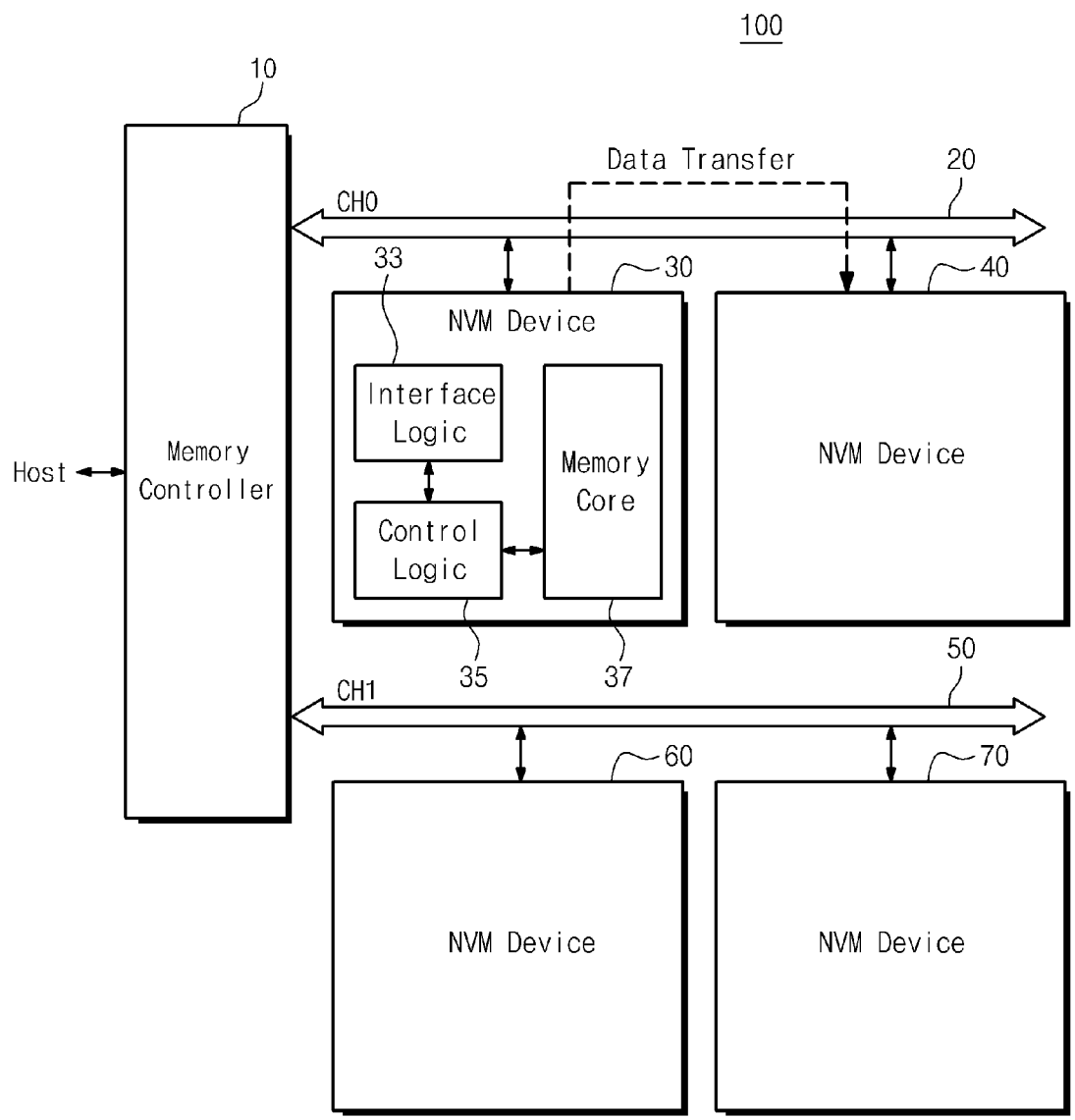
FIG. 1 is a block diagram of a multi-chip memory system according to an embodiment of the inventive concept.

FIG. 1 is a block diagram of a multi-chip memory system 100 according to an embodiment of the inventive concept. For simplicity, FIG. 1 illustrates a multi-chip memory system comprising four memory devices. However, the multi-chip memory system could be modified to incorporate additional or fewer memory devices.

Referring to FIG. 1, multi-chip memory system 100 comprises a memory controller 10, a plurality of channels 20 and 50, and a plurality of nonvolatile memory (NVM) devices 30, 40, 60 and 70.

For explanation purposes, it will be assumed that nonvolatile memory devices 30, 40, 60 and 70 comprise NAND flash memories. However, the inventive concept is not limited to NAND flash memory, and can be embodied with different types of nonvolatile memory devices, such as NOR flash memory device, phase-change RAMs (PRAMs), ferroelectric RAMs (FRAMs), and magnetic RAMs (MRAMs).

Memory controller 10 controls memory system 100 to execute commands requested by a host system. In some embodiments, memory controller 10 controls memory system 100 by driving firmware. Although not illustrated in FIG. 1, memory controller 10 can further comprise a random-access memory (RAM) for storing the firmware and a host interface for interfacing with the host.

Memory controller 10 and flash memories 30, 40, 60 and 70 are connected to channels 20 and 50, and each of the channels comprises a data bus and a control bus. Accordingly, memory controller 10 and flash memories 30, 40, 60 and 70 can share data signals and control signals with each other through channels 20 and 50. Channel 20 is connected to flash memories 30 and 40 and channel 50 is connected to flash memories 60 and 70.

Flash memory 30 comprises interface logic 33, control logic 35, and a memory core 37. Interface logic 33 decodes a control signal input from memory controller 10, and provides the decoded control signal to control logic 35. Based on the decoded control signal received from interface logic 33, control logic 35 generates a control signal or voltage for controlling the components of flash memory 30, such as memory core 37. Memory core 37 comprises a memory cell array for storing data (See, e.g., element 38 in FIG. 2) and a read/write circuit for reading/writing data from/into the memory cell array (See, e.g., element 39 in FIG. 2). Flash memories 40, 60 and 70 have substantially the same configuration as flash memory 30.

Memory controller 10 provides a control signal to flash memories 30, 40, 60 and 70 through the control buses of channels 20 and 50. In response to the control signal, flash memories 30, 40, 60 and 70 transfer stored data to memory controller 10 through the data buses of channels 20 and 50. In addition, flash memories 30, 40, 60 and 70 store data received from memory controller 10 through the data buses of channels 20 and 50. Because the control signals and data is transferred through channels 20 and 50 to flash memories 30, 40, 60 and 70, the flash memories connected to each channel can share the corresponding control signals and data with each other.

In some embodiments, data output from flash memory 30 is shared with flash memory 40 through the data bus of channel 20. Thus, data transmitted on the data bus of channel 20 can be provided directly to flash memory 40 without transferring the data to memory controller 10, and flash memory 40 can perform a write operation on the data loaded on the data bus of channel 20 under the control of memory controller 10. Such an operation is referred to as a direct data transfer operation, and will be explained in further detail with reference to FIG. 5.

Figure 2:
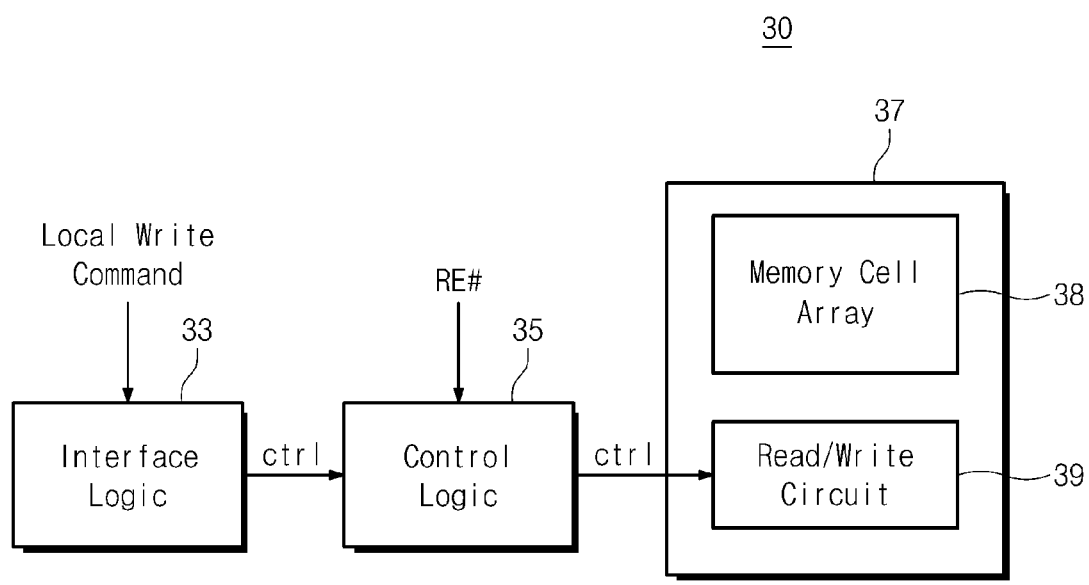
FIG. 2 is a diagram illustrating an embodiment of a flash memory device in the multi-chip memory system of FIG. 1.

FIG. 2 is a diagram illustrating an embodiment of flash memory 30 of FIG. 1. The diagram of FIG. 2 is provided as an example of the internal operation of flash memory 30.

Referring to FIG. 2, when a local write command is provided from memory controller 10 to flash memory 30, interface logic 33 receives and decodes the local write command and transmits corresponding control signals to control logic 35. Control logic 35 receives the control signals and, in response to the control signals, controls a write operation corresponding to the local write command. The local write command is provided to transfer data directly between memories of memory system 100. In particular, the local write command is used to write data that is output from source flash memory 30 and shared through the data bus of channel 20, into target flash memory 40.

The write operation is performed according to a read control signal, such as a read enable signal RE#. For example, in a local write operation, control logic or interface logic 33 can provide read enable signal RE# as a control signal (e.g., a clock signal) to read/write circuit 39. According to the clock signal, read/write circuit 39 receives data from memory controller 10 and stores the received data in memory cell array 38.

Figure 3:
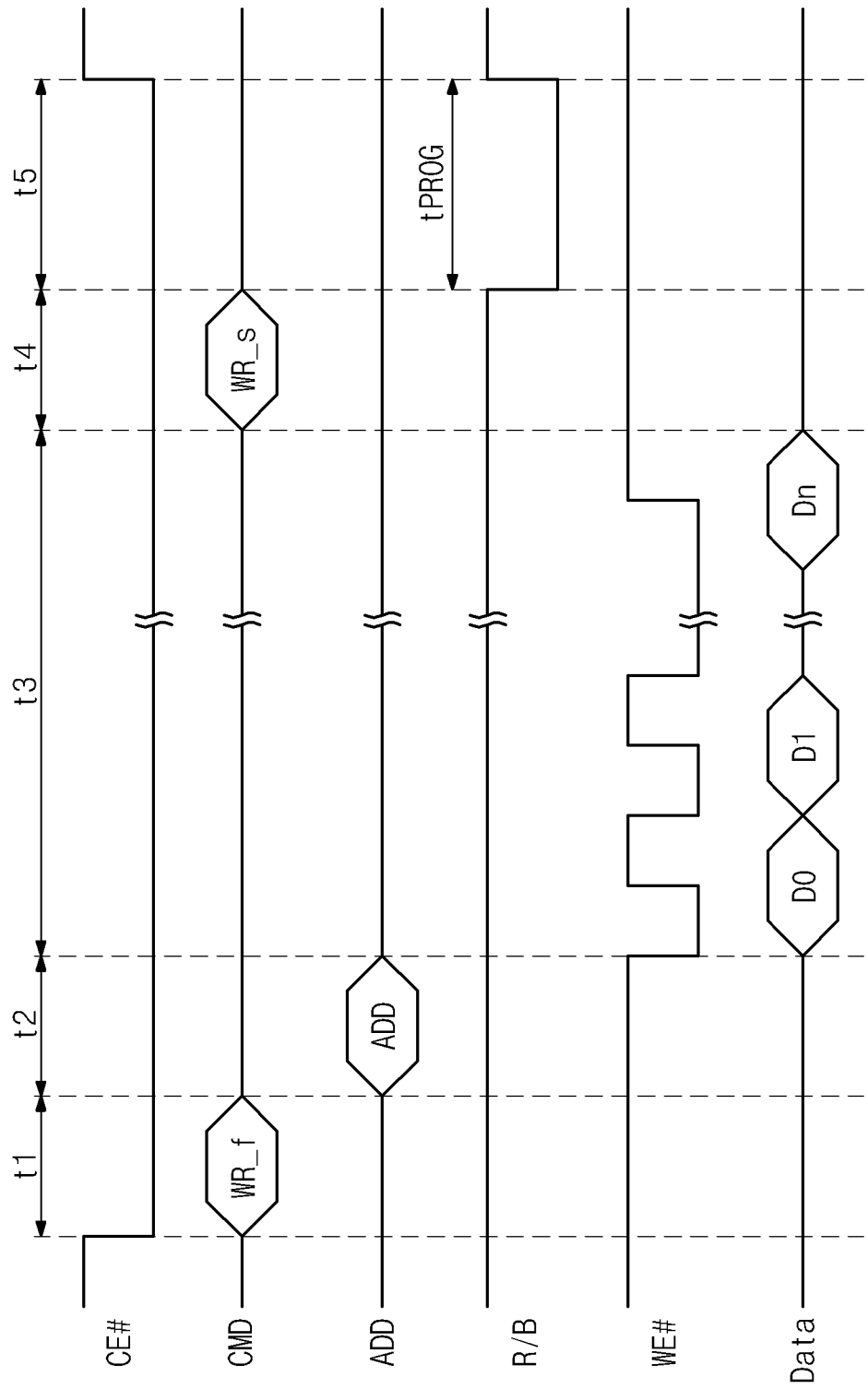
FIG. 3 is a timing diagram illustrating a write operation of the flash memory device of FIG. 2.

FIG. 3 is a timing diagram illustrating a write operation of flash memory 40.

In the example of FIG. 3, memory controller 10 generates control signals CE#, CMD, ADD and WE# to write data into flash memory 40. Memory controller 10 also transmits a data signal "Data" to flash memory 40 through the data bus of channel 20. Flash memory 40 generates a state signal RB to indicate whether it is ready or busy.

Referring to FIG. 3, flash memory 40 is enabled when a chip enable signal CE# is logic '0' (or logic 'low'). Thus, memory controller 10 maintains chip enable signal CE# at logic '0' (or logic 'low') throughout an interval comprising periods t1~t5 while flash memory 40 receives and writes data in selected memory cells.

In period t1, memory controller 10 provides a first write command WR_f to flash memory 40. Then, in period t2, memory controller 10 provides flash memory 40 with an address ADD of the selected memory cells where data is to be written. Thereafter, in period t3, memory controller 10 inputs the data to be written and toggles a write enable signal WE#. The data is input to flash memory 40 while write enable signal WE# is toggled. The data is temporarily stored in a data input/output circuit, such as a page buffer, of flash memory 40.

Next, in period t4, memory controller 10 provides a second write command WR_s to flash memory 40. Then, in period t5, flash memory 40 writes the data from the data input/output circuit into the selected memory cells.

Figure 4:
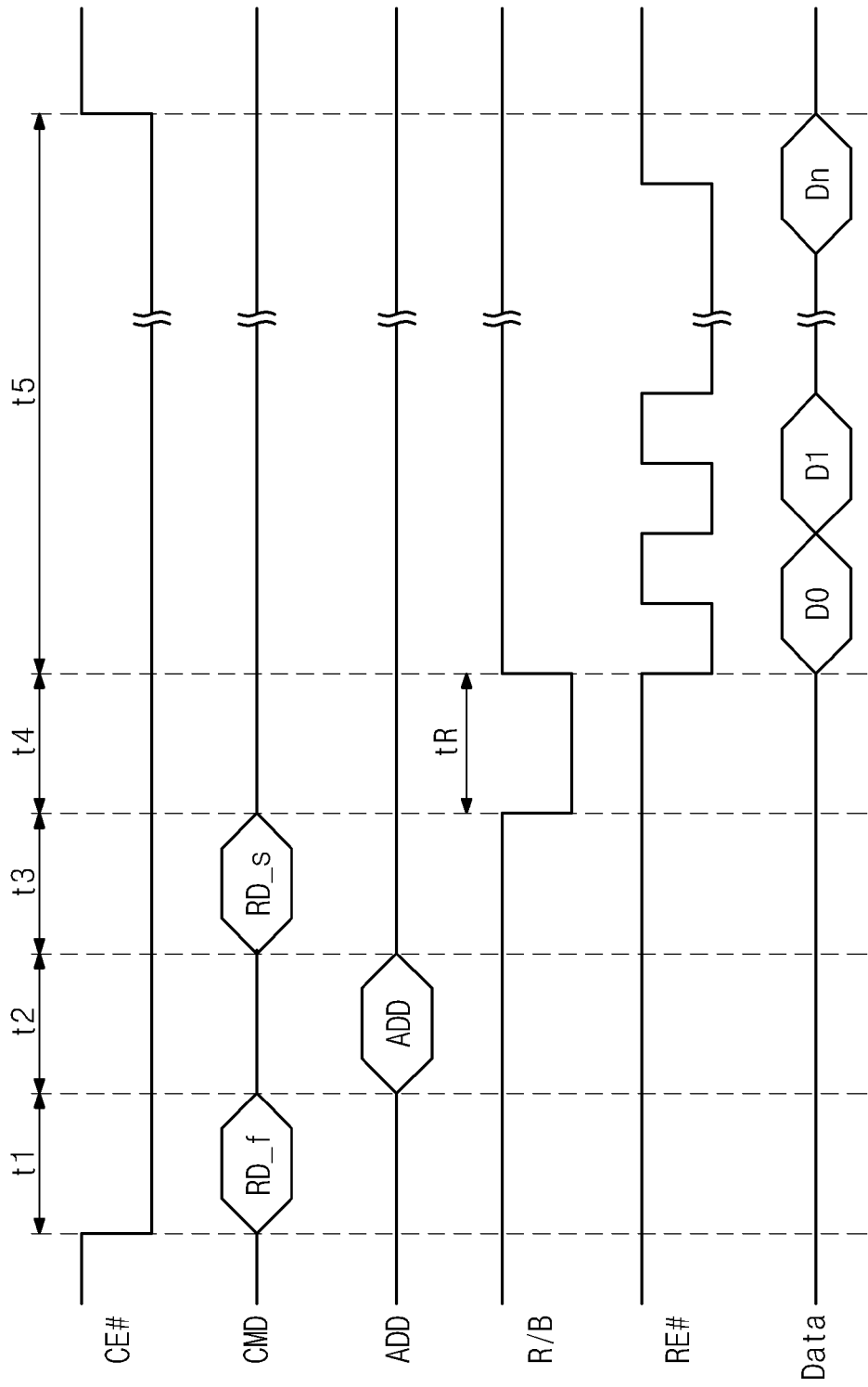
FIG. 4 is a timing diagram illustrating a read operation of the flash memory device of FIG. 2.

FIG. 4 is a timing diagram illustrating a read operation of flash memory 30.

In the example of FIG. 4, memory controller 10 generates control signals CE#, CMD, ADD and RE# to read data from flash memory 30. In addition, memory controller 10 receives a data signal "Data" output from flash memory 30 to the data bus of channel 20. Flash memory 30 generates a state signal R/B to indicate whether it is ready or busy.

Referring to FIG. 4, flash memory 30 is enabled when a chip enable signal CE# is logic '0' (or logic 'low'). Memory controller 10 maintains chip enable signal CE# at logic '0' (or logic 'low') during an interval comprising periods t1~t5 while flash memory 30 reads data from selected memory cells and outputs the read data.

In period t1, memory controller 10 provides a first read command RD_f to flash memory 30. In period t2, memory controller 10 provides flash memory 30 with an address ADD of the selected memory cells from which to read data. In period t3, memory controller 10 provides a second read command RD_s to flash memory 30. Then, in period t4, flash memory 30 reads the data stored in the selected memory cells. This period is called a read time tR or an access time.

In period t5, flash memory 30 outputs the data read from the selected memory cells. At this point, memory controller 10 toggles read enable signal RE#. The data read from the selected memory cell is output from flash memory 30 while read enable signal RE# is toggled.

Figure 5:
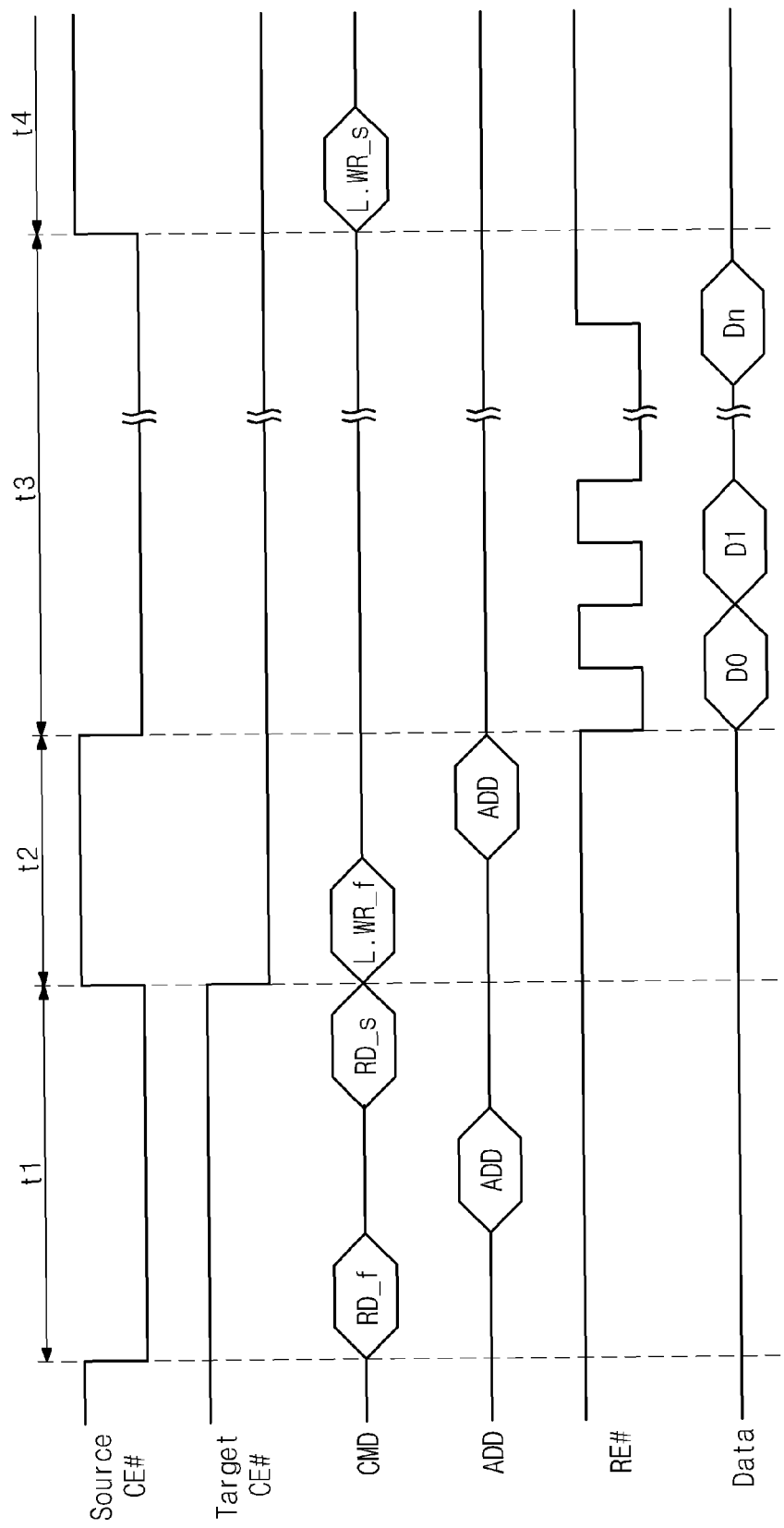
FIG. 5 is a timing diagram illustrating direct data transfer between memory devices of a multi-chip memory system according to an embodiment of the inventive concept.

FIG. 5 is a timing diagram illustrating direct data transfer between memory devices of memory system 100 according to an embodiment of the inventive concept. In the example of FIG. 5, the direct data transfer is used to transfer data from flash memory 30 to flash memory 40. Accordingly, flash memory 30 will be referred to as a source flash memory, and flash memory 40 will be referred to as a target flash memory.

FIG. 5 illustrates control signals Source CE#, Target CE#, CMD, ADD, and RE# that are used to control the direct data transfer in memory system 100, and a data signal "Data" that is output to the data bus of channel 20 in response to the control signals.

Referring to FIG. 5, in a period t1, memory controller 10 controls source flash memory 30 using a chip enable signal Source CE#, a command CMD, and an address ADD. Source flash memory 30 is enabled when chip enable signal Source CE# is logic '0' (or logic 'low'). Thus, memory controller 10 maintains chip enable signal Source CE# at logic '0' (or logic 'low') while source flash memory 30 reads data from selected source memory cells and outputs the read data during period t1 and a period t3. In period t1, memory controller 10 sequentially generates a first read command RD_f, an address ADD and a second read command RD_s so that source flash memory 30 outputs stored data. This control operation can vary according to the type of the source memory device storing the data to be transferred.

Next, in a period t2, memory controller 10 controls target flash memory 40 using a chip enable signal Target CE#, a command CMD and an address ADD. Target flash memory 40 is enabled when chip enable signal Target CE# is logic '0' (or logic 'low'). Thus, memory controller 10 maintains chip enable signal Target CE# at logic '0' (or logic 'low') while target flash memory 40 receives and writes data in selected target memory cells during periods t2~t4. In period t2, memory controller 10 sequentially generates a first local write command L.WR_f and an address ADD so that target flash memory 40 writes the received data. This control operation can vary according to the type of the target memory device to store the transferred data.

Period t2 for controlling target flash memory 40 by memory controller 10 corresponds to the period for reading the data from the selected source memory cells of source flash memory 30. In other words, period t2 corresponds to a read time tR or an access time. Read time tR of source flash memory 30 can be about tens of microseconds (μs), and chip enable signal Source CE# of source flash memory 30 can be maintained at logic '1' (or logic 'high') during the read time. Also, memory controller 10 can control target flash memory 40 during read time tR of source flash memory 30.

In period t3, source flash memory 30 outputs the data read from the selected source memory cells. At this point, memory controller 10 toggles read enable signal RE#. The data read from the selected source memory cells is output from source flash memory 30 whenever read enable signal RE# is toggled. The output data is shared through the data bus of channel 20 by memory controller 10 and target flash memory 40.

Concurrently, in period t3, target flash memory 40 receives the data shared through the data bus of channel 20. The received data is temporarily stored in a data input/output circuit, such as a page buffer, of target flash memory 40. Because target flash memory 40 is provided with local write command L.WR, the shared data is stored in the data input/output circuit of target flash memory 40 whenever read enable signal RE# is toggled.

In period t4, memory controller 10 provides a second local write command L.WR_s to target flash memory 40. When receiving the second local write command L.WR_s, target flash memory 40 writes the data stored in the data input/output circuit into the selected target memory cells.

In period t3, chip enable signal Source CE# of source flash memory 30 and chip enable signal Target CE# of target flash memory 40 are activated simultaneously. That is, the chip enable signals of the memory devices connected to the same channel are simultaneously enabled for the direct data transfer between the memory devices.

Figure 6:
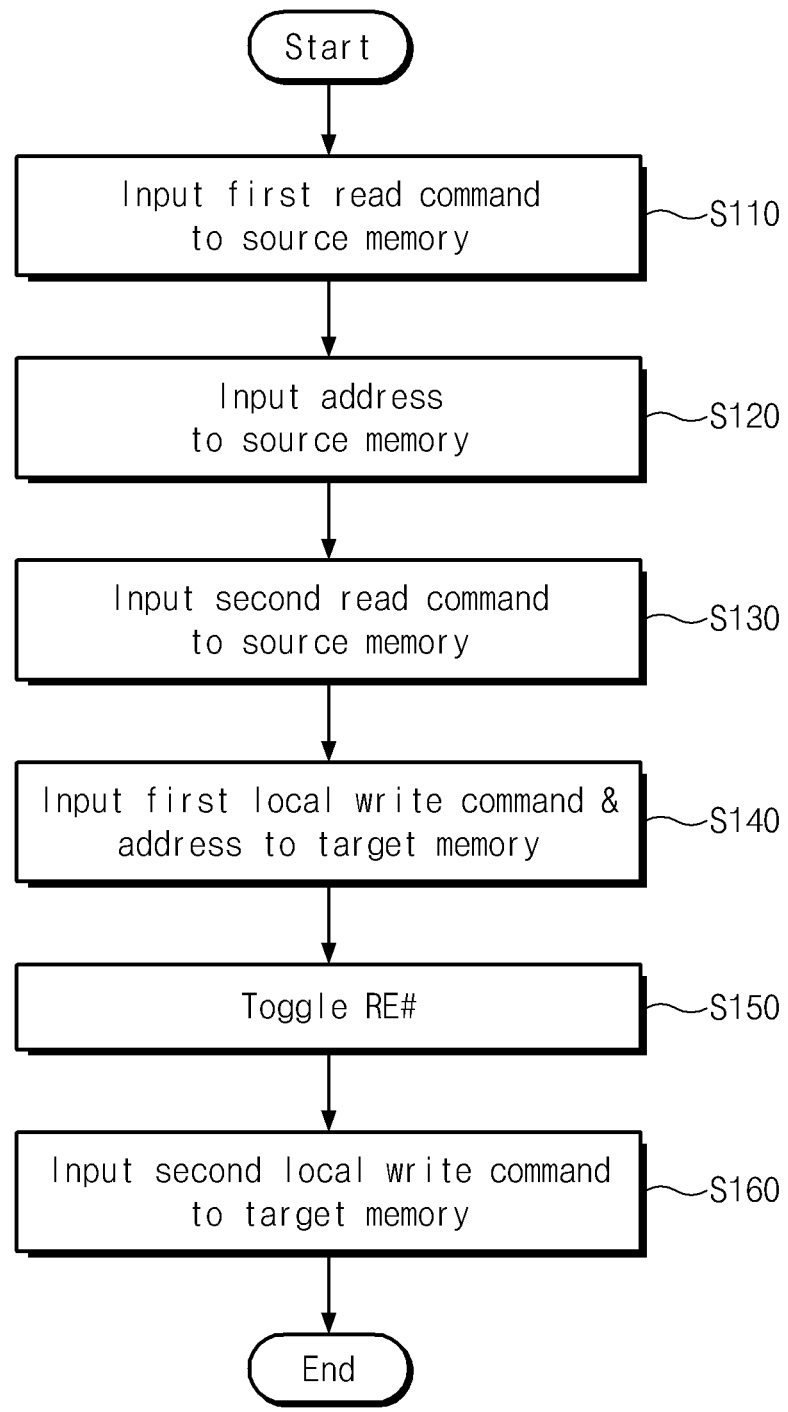
FIG. 6 is a flowchart illustrating a method of performing direct data transfer between memory devices of a multi-chip memory system according to an embodiment of the inventive concept.

FIG. 6 is a flowchart illustrating a method of performing direct data transfer between the memory devices of the memory system 100 according to an embodiment of the inventive concept. In the description that follows, example method steps are indicated by parentheses (SXXX).

Referring to FIG. 6, memory controller 10 provides a first read command to source memory device 30 (S110). Memory controller 10 then provides source memory device 30 with an address of source memory cells from which to read data (S120). Next, memory controller 10 provides a second read command to source memory device 30 (S130).

During a predetermined period (e.g., a read time tR) for reading data stored in the memory cell by source memory device 30, memory controller 10 provides target memory device 40 with a first local write command and an address of a memory cell to write data in (S140).

After the predetermined period, memory controller 10 provides a read control signal to source memory device 30 and target memory device 40. For example, read enable signal RE# can be toggled. In response to the toggled read enable signal RE#, source memory device 30 outputs the data read from the source memory cells to share the data through the data bus and target memory device 40 receives the shared data (S150).

Thereafter, memory controller 10 provides a second local write command to target memory device 40 (S160). When receiving the second local write command, target memory device 40 writes the received data into target memory cells. The data output from source memory device 30 is input into target memory device 40 without passing through memory controller 10. That is, the data is directly transferred between the memory devices 30 and 40 through the data bus of channel 20.

Figure 7:
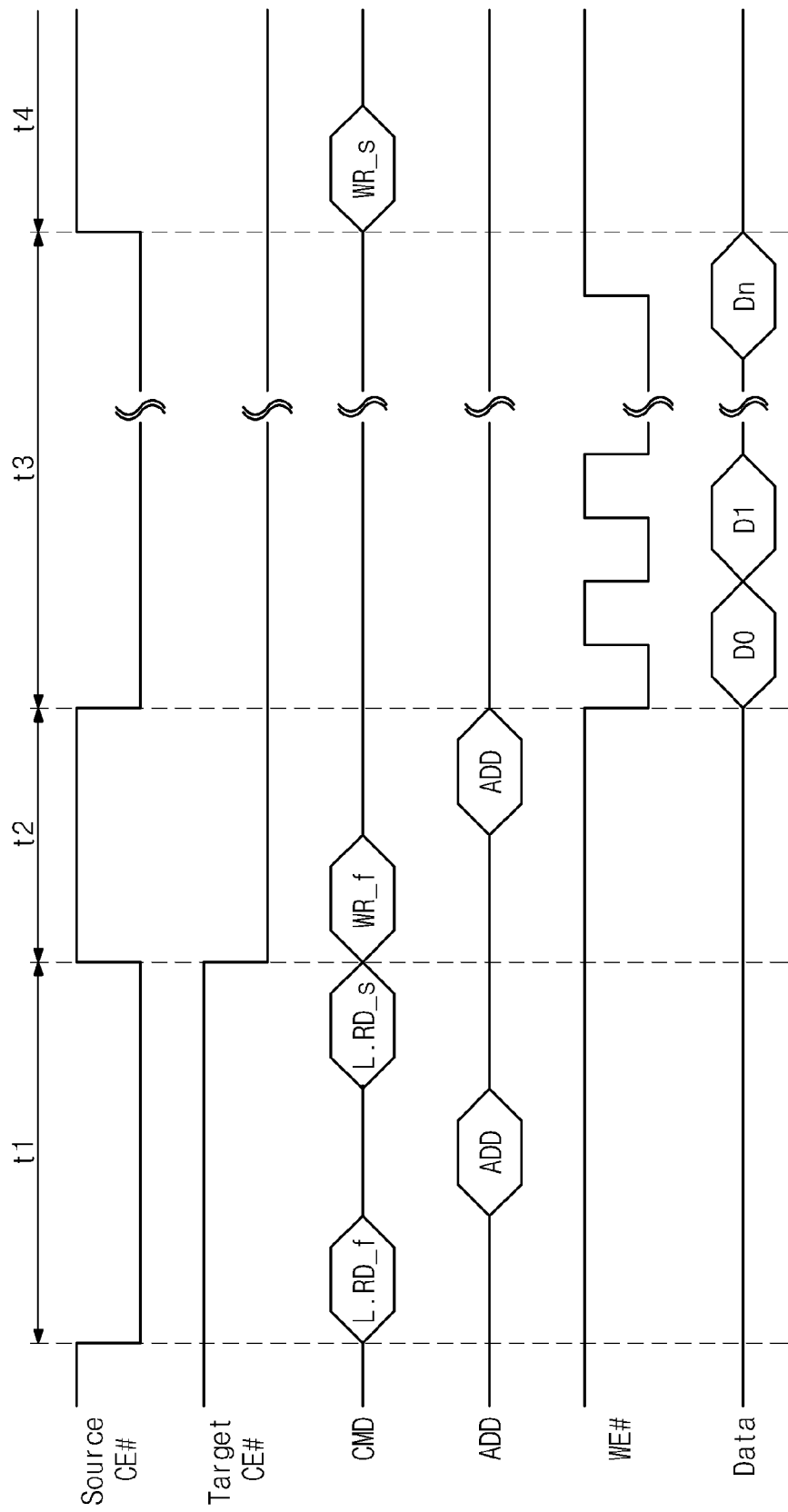
FIG. 7 is a timing diagram illustrating direct data transfer between memory devices of a multi-chip memory system according to an embodiment of the inventive concept.

FIG. 7 is a timing diagram illustrating direct data transfer between memory devices of memory system 100 according to an embodiment of the inventive concept. In the example of FIG. 7, the direct data transfer is used to transfer data from flash memory 30 to flash memory 40. Accordingly, flash memory 30 will be referred to as a source flash memory, and flash memory 40 will be referred to as a target flash memory.

In the example of FIG. 7, the direct data transfer is used to transfer data from flash memory 30 to flash memory 40. Accordingly, flash memory 30 will be referred to as a source flash memory, and flash memory 40 will be referred to as a target flash memory.

FIG. 7 illustrates control signals Source CE#, Target CE#, CMD, ADD and WE# that are used to control direct data transfer between flash memories 30 and 40 in memory system 100, and a data signal "Data" that is output from source flash memory 30 to the data bus of channel 20 in response to the control signals.

Referring to FIG. 7, in a period t1, memory controller 10 controls source flash memory 30 using a chip enable signal Source CE#, a command CMD and an address ADD. Source flash memory 30 is enabled when chip enable signal Source CE# is logic '0' (or logic 'low'). Thus, memory controller 10 maintains chip enable signal Source CE# at logic '0' (or logic 'low') while source flash memory 30 reads data from selected source memory cells and outputs the read data in periods t1 and t3. In period t1, memory controller 10 sequentially generates a first local read command L.RD_f, an address ADD, and a second local read command L.RD_s so that source flash memory 30 outputs stored data. This control operation can vary according to the type of the source memory device storing the data to be transferred.

In a period t2, memory controller 10 controls target flash memory 40 using a chip enable signal Target CE#, a command CMD and an address ADD to target flash memory 40. Target flash memory 40 is enabled when chip enable signal Target CE# is logic '0' (or logic 'low'). Thus, memory controller 10 maintains chip enable signal Target CE# at logic '0' (or logic 'low') while target flash memory 40 receives and writes data in a memory cell in periods t2 through t4. Also, in period t2, memory controller 10 sequentially provides a first write command WR_f and an address ADD so that target flash memory 40 writes the received data. This control operation can vary according to the type of the target memory device to store the transferred data.

During period t2, source flash memory 30 also reads data stored in the selected source memory cells. That is, period t2 corresponds to a read time tR or an access time. Read time tR of source flash memory 30 typically lasts tens of microseconds, and chip enable signal Source CE# of source flash memory 30 is maintained at logic '1' (or logic 'high') during the read time. Also, memory controller 10 controls target flash memory 40 during read time tR of source flash memory 30.

In period t3, source flash memory 30 outputs the data read from the selected source memory cells. At this point, memory controller 10 toggles write enable signal WE#. Because source flash memory 30 is provided with local read command L.RD, the data read from the memory cell is output from source flash memory 30 while write enable signal WE# is toggled. The output data is shared through the data bus of channel 20 by memory controller 10 and target flash memory 40. Concurrently, in period t3, target flash memory 40 receives the data shared through the data bus of channel 20. The received data is temporarily stored in a data input/output circuit (e.g., a page buffer) of target flash memory 40. The shared data is stored in the data input/output circuit of target flash memory 40 while write enable signal WE# is toggled.

In period t4, memory controller 10 provides a second write command WR_s to target flash memory 40. When receiving second write command WR_s, target flash memory 40 writes the data, stored in the data input/output circuit, into the memory cell.

In period t3, chip enable signal Source CE# of source flash memory 30 and chip enable signal Target CE# of target flash memory 40 are activated simultaneously. That is, the chip enable signals of the memory devices connected to the same channel are simultaneously enabled for the direct data transfer between flash memory devices 30 and 40.

Figure 8:
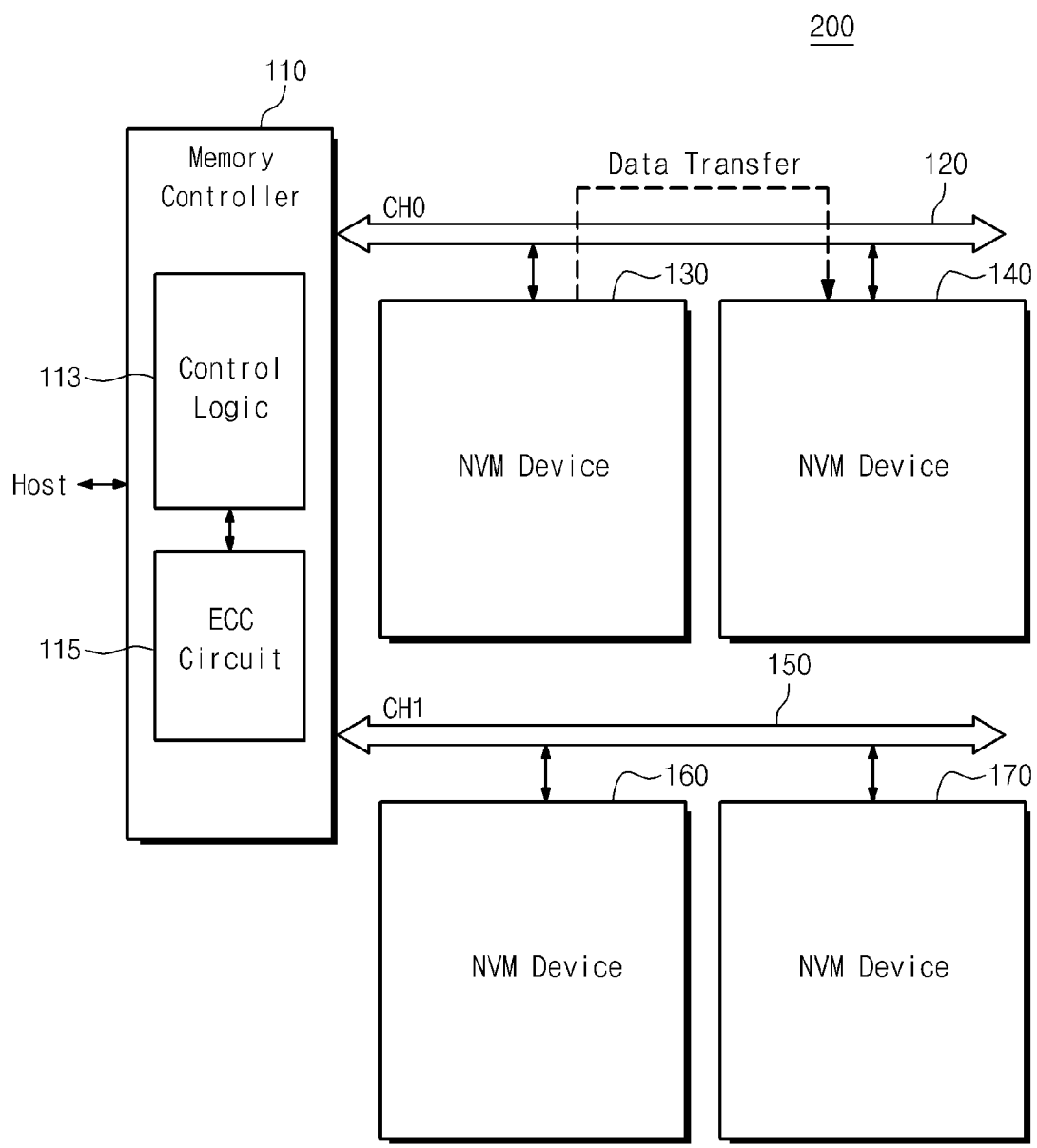
FIG. 8 is a block diagram of a multi-chip memory system according to an embodiment of the inventive concept.

FIG. 8 is a block diagram of a multi-chip memory system according to an embodiment of the inventive concept. For simplicity, FIG. 8 illustrates a multi-chip memory system comprising four memory devices. However, the multi-chip memory system could be modified to incorporate additional or fewer memory devices.

Referring to FIG. 8, a multi-chip memory system 200 comprises a memory controller 110, a plurality of channels 120 and 150, and a plurality of NVM devices 130, 140, 160 and 170. With the exception of memory controller 110, the features of memory system 200 are the same as corresponding features of FIG. 1, so a description these features will be omitted to avoid redundancy. In particular, channels 120 and 150 are the same as respective channels 20 and 50, and NVM devices 130, 140, 160 and 170 are the same as respective NVM devices 30, 40, 60 and 70.

Memory controller 110 comprises control logic 113 and an error correction code (ECC) circuit 115.

Control logic 113 controls memory system 200 to execute commands, such as data read/write commands, requested by a host system. Typically, control logic 113 drives a firmware to control memory system 200. Although not illustrated in FIG. 8, memory controller 110 can further comprise a random-access memory for storing the firmware and a host interface for interfacing with the host.

In a write operation, ECC circuit 115 generates ECC data from data provided to a flash memory and provides the generated ECC data to the flash memory. The ECC data is stored in the flash memory together with the provided data. In a read operation, ECC circuit 115 detects and corrects a possible error in data transferred from the flash memory.

Where the flash memory comprises multi-level cells, ECC circuit 115 corrects N-bit errors corresponding to erroneous N-bit memory cells, where N is an integer greater 1. On the other hand where the flash memory comprises single-level cells, ECC circuit 115 corrects 1-bit errors corresponding to erroneous 1-bit memory cells.

In some embodiments, where data is directly transferred between flash memories 130 and 140 in memory system 200, ECC circuit 115 detects whether the transferred data contains any errors. The data output from source flash memory 130 is shared through data bus 120 by memory controller 110 and target flash memory 140. ECC circuit 115 detects whether there is an error in the shared data. Where there is an error in the shared data, memory controller 110 controls the data to be directly transferred between flash memories 130 and 140 using an operation described with reference to FIG. 9.

In some embodiments, where data is directly transferred between flash memories 130 and 140 in memory system 200, ECC circuit 115 detects and corrects errors in the transferred data. The data output from source flash memory 130 is shared through data bus 120 by memory controller 110 and target flash memory 140. ECC circuit 115 detects whether there is an error in the shared data. Where there is an error in the shared data, ECC circuit 115 corrects the error, and memory controller 110 controls target flash memory 140 to store the error-corrected data using an operation described with reference to FIGS. 10A and 10B.

Figure 9:
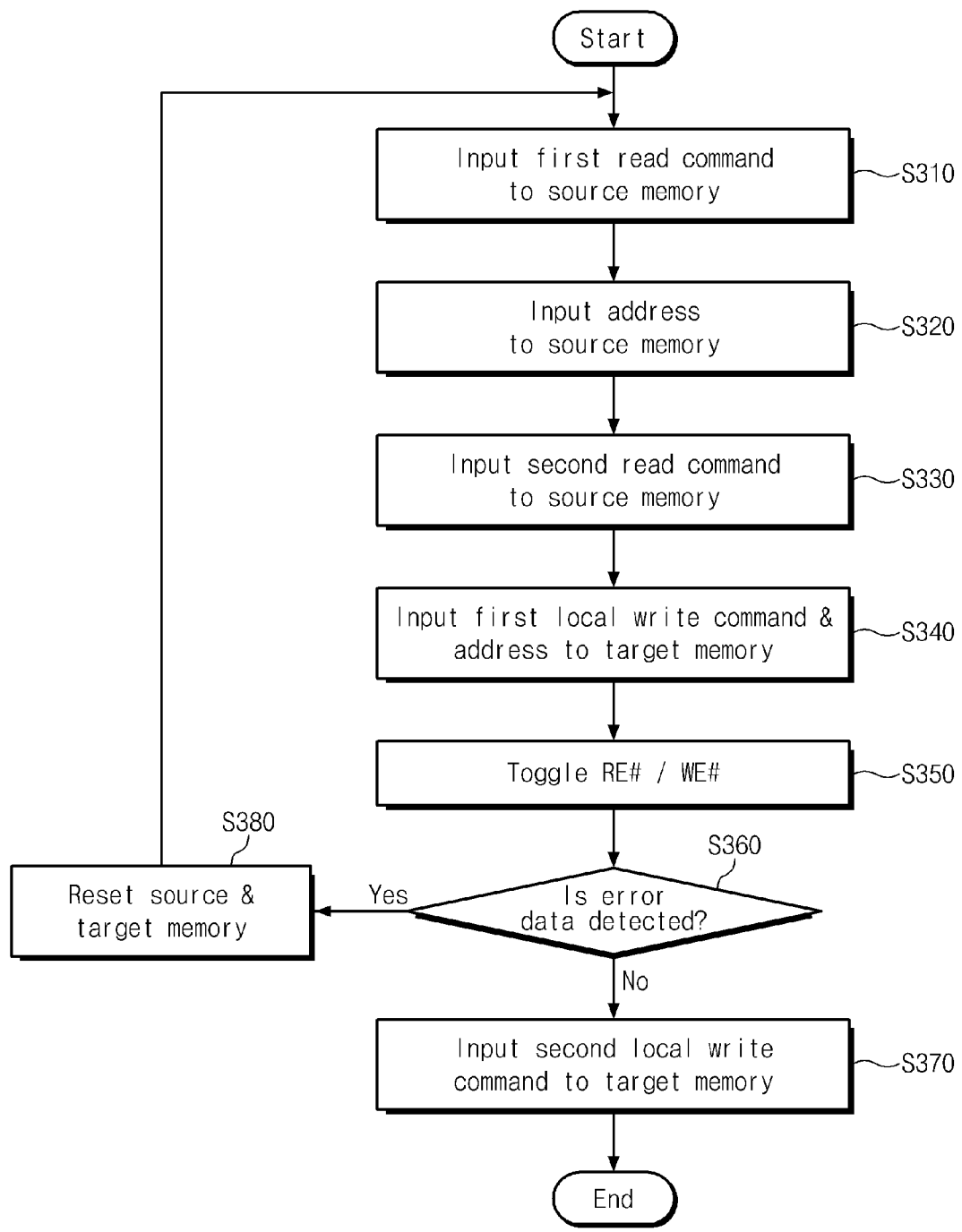
FIG. 9 is a flowchart illustrating a processing method to be performed in the event of a transfer error in a multi-chip memory system according to an embodiment of the inventive concept.

FIG. 9 is a flowchart illustrating a processing method to be performed in the event of a transfer error in multi-chip memory system 200 according to an embodiment of the inventive concept.

Referring to FIG. 9, memory controller 110 provides a first read command to source memory device 130 (S310). Memory controller 110 provides source memory device 130 with an address of selected source memory cell from which data is to be read (S320). Memory controller 110 provides a second read command to source memory device 130 (S330).

During a predetermined period (e.g., read time tR) for reading data stored in the selected source memory cells, memory controller 110 provides target memory device 140 with a first local write command and an address of selected target memory cells in which to write data (S340).

After the predetermined period, memory controller 110 provides a control signal to source memory device 130 and target memory device 140. For example, read enable signal RE# is toggled. In response to the toggled read enable signal RE#, source memory device 130 outputs the data read from the selected source memory cells to share the data through the data bus and target memory device 140 receives the shared data (S350).

Concurrently, ECC circuit 115 receives the shared data and detects whether there is an error in the data (S360). Where there is no error in the data output from source memory device 130, ECC circuit 115 generates a pass signal. In response to the pass signal, memory controller 110 provides a second local write command to target memory device 140 (S370). In response to the second local write command, target memory device 140 writes the received data into the selected target memory cells.

On the other hand, where there is an error in the data output from source memory device 130, ECC circuit 115 transmits a fail signal to memory controller 110. In response to the fail signal, memory controller 110 resets source memory device 130 and target memory device 140 (S380). Thereafter, the operation for direct data transfer between flash memories 130 and 140 returns to step S310.

Figure 10A:
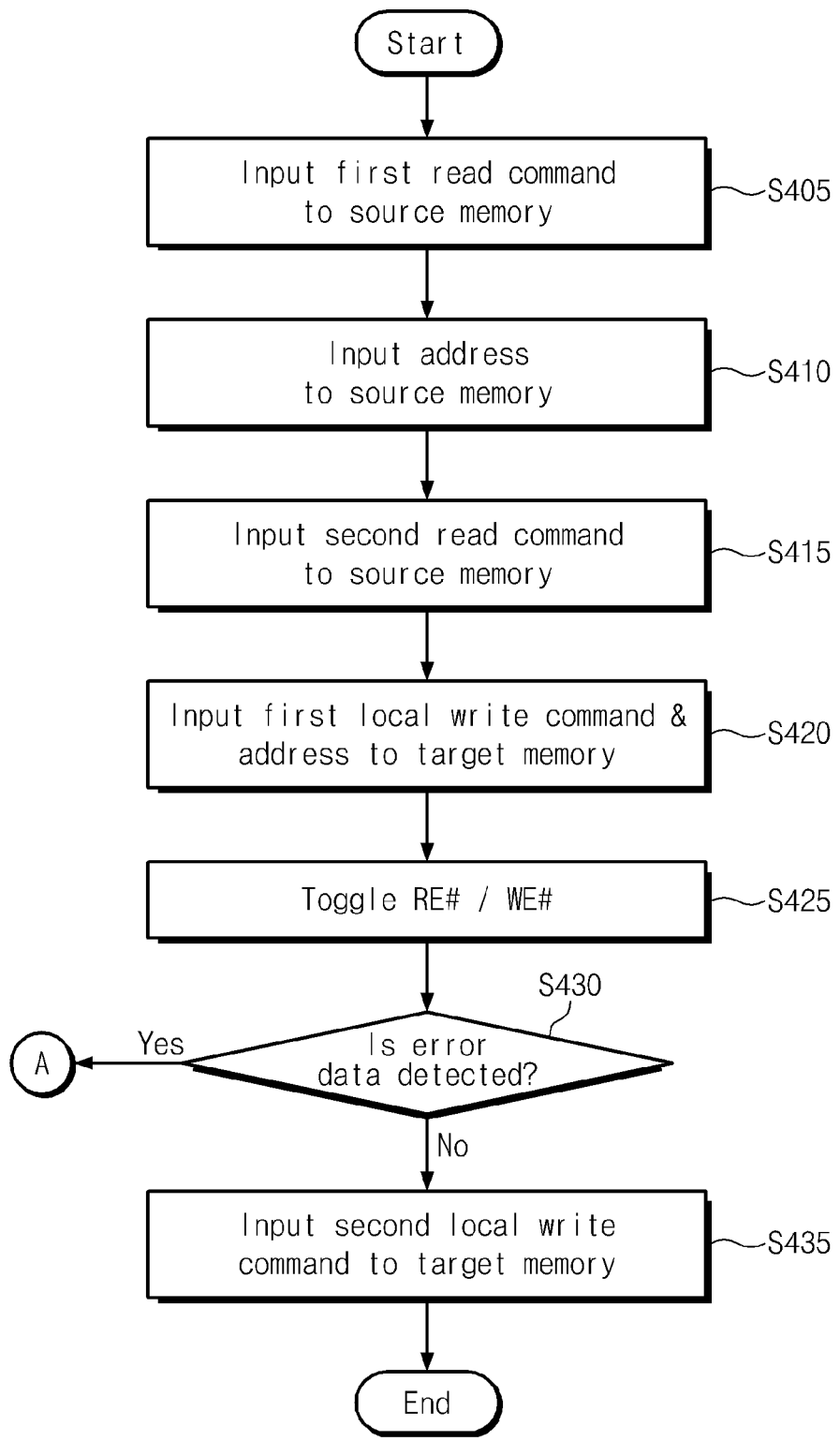
FIGS. 10A and 10B are flowcharts illustrating another processing method to be performed in the event of a transfer error in a multi-chip memory system according to an embodiment of the inventive concept.
Figure 10B:
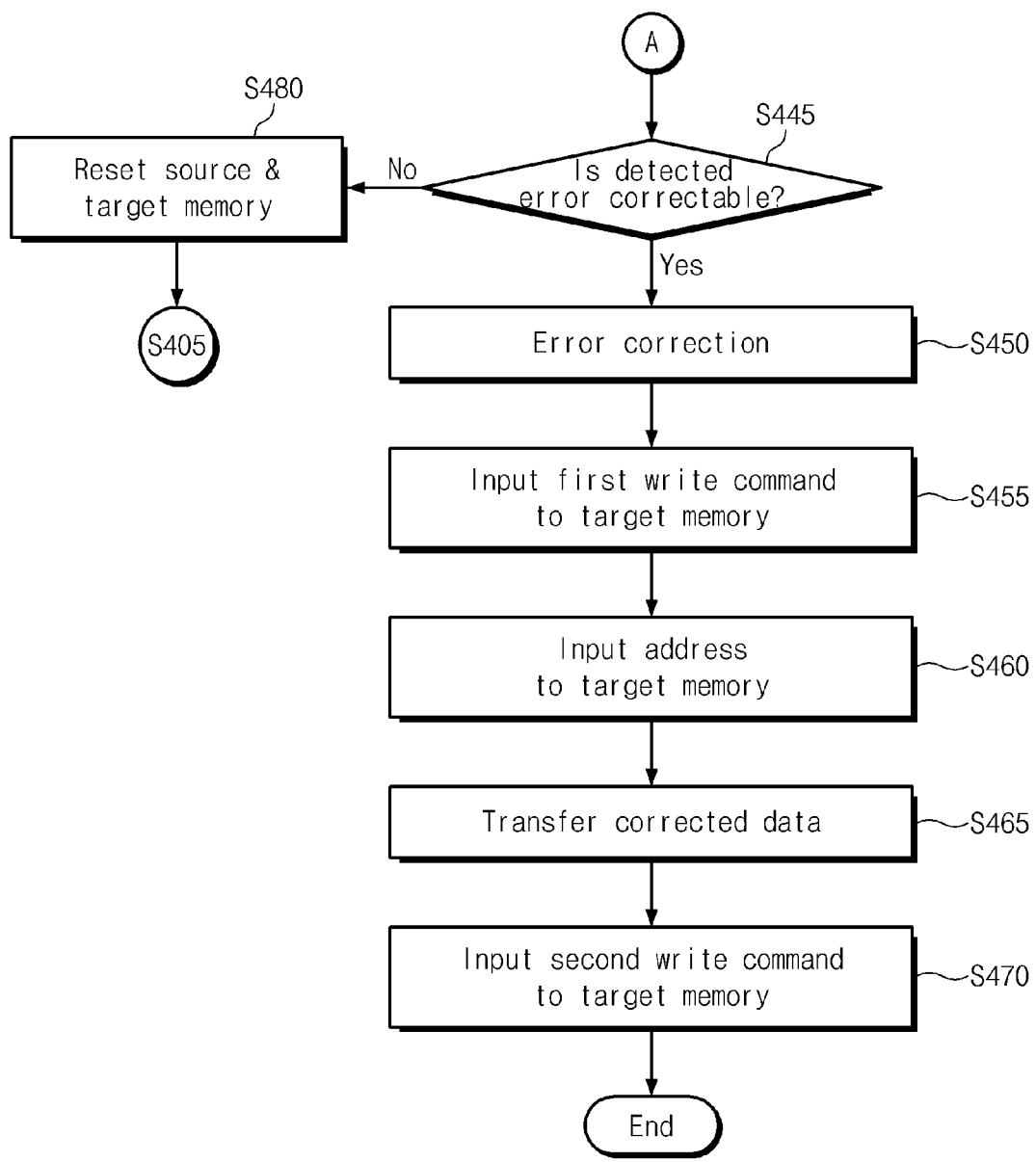

FIGS. 10A and 10B are flowcharts illustrating another processing method to be performed in the event of a transfer error in the multi-chip memory system according to an embodiment of the inventive concept.

Referring to FIGS. 10A and 10B, memory controller 110 provides a first read command to source memory device 130 (S405). Memory controller 110 provides source memory device 130 with an address of selected source memory cells from which to read data (S410). Memory controller 110 provides a second read command to source memory device 130 (S415).

During a predetermined period (e.g., a read time tR) for reading data stored in the selected source memory cells, memory controller 110 provides target memory device 140 with a first local write command and an address of selected target memory cells in which to write data (S420).

After the predetermined period, memory controller 110 provides a control signal to source memory device 130 and target memory device 140. For example, read enable signal RE# is toggled. In response to the toggled read enable signal RE#, source memory device 130 outputs the data read from selected source memory cells to share the data through the data bus and target memory device 140 receives the shared data (S425).

Concurrently, ECC circuit 115 receives the shared data and detects whether the data contains any errors (S430). Where there is no error in the data output from source memory device 130, ECC circuit 115 generates a pass signal. In response to the pass signal, memory controller 110 provides a second local write command to target memory device 140 (S435). In response to the second local write command, target memory device 140 writes the received data into the selected target memory cells.

On the other hand, where there is an error in the data output from source memory device 130, ECC circuit 115 detects whether the detected error is correctable (S445). If the detected error is not correctable, memory controller 110 resets source memory device 130 and target memory device 140 (S480). Thereafter, the operation for direct data transfer between flash memories 130 and 140 returns to step S405.

On the other hand, if the detected error is correctable, ECC circuit 115 corrects the detected error in the received data (S450). Memory controller 110 resets target memory device 140 and provides a first write command to target memory device 140 (S455). Also, memory controller 110 provides target memory device 140 with an address of other selected target memory cells in which to write data (S460). In one embodiment, the address of step S460 is identical to the address of the selected target memory cells provided in step S420. In other embodiments, the address of step S460 is different from the address of step S420.

Memory controller 110 transfers data corrected by ECC circuit 115 to target memory device 140 (S465). Memory controller 110 provides a second write command to target memory device 140 to store the transferred data (S470). In response to the second write command, target memory device 140 writes the received data into the other selected target memory cells.

Figure 11:
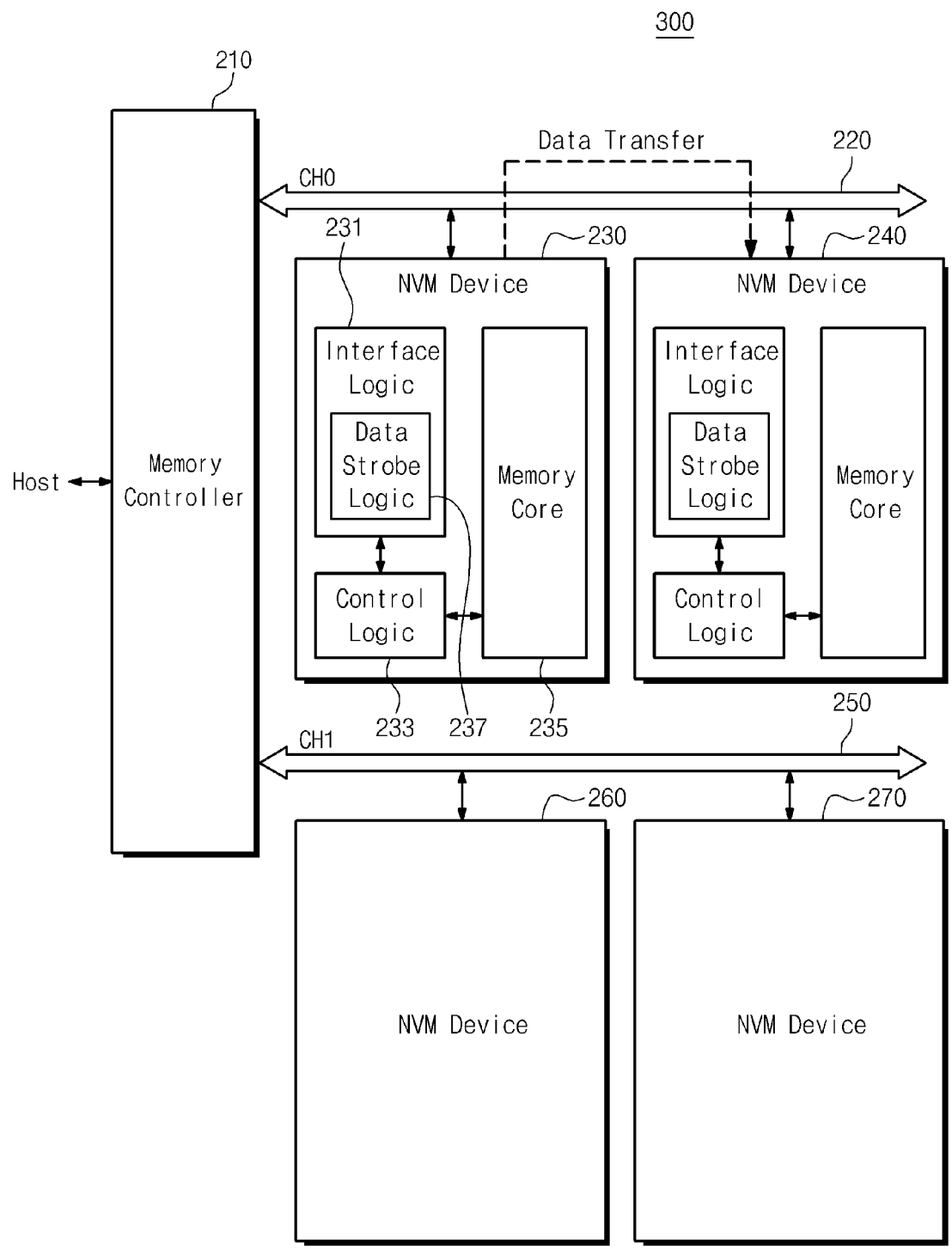
FIG. 11 is a block diagram of a multi-chip memory system according to an embodiment of the inventive concept.

FIG. 11 is a block diagram of a multi-chip memory system according to an embodiment of the inventive concept.

For simplicity, FIG. 11 illustrates a multi-chip memory system comprising four memory devices. However, the multi-chip memory system could be modified to incorporate additional or fewer memory devices.

Referring to FIG. 11, a multi-chip memory system 300 comprises a memory controller 210, a plurality of channels 220 and 250, and a plurality of NVM devices 230, 240, 260 and 270. With the exception of NVM devices 230, 240, 260, and 270, the features of memory system 200 are the same as corresponding features of FIG. 1, so a description these features will be omitted to avoid redundancy. In particular, channels 220 and 250 are the same as respective channels 20 and 50, and memory controller 210 is the same as memory controller 10.

Flash memory 230 comprises interface logic 231, control logic 233, and a memory core 235. Control logic 233 generates a control signal or voltage in response to a command requested by flash memory 230, such as a read, write, or erase command. Memory core 235 comprises a memory cell (not illustrated) for storing data and a read/write circuit (not illustrated) for reading/writing data from/into a memory cell.

Interface logic 231 decodes control signals received from memory controller 210 to generate input signals for control logic 233. The control signals comprises a chip enable signal CE#, an address latch enable signal ALE, a command latch enable signal CLE, a write enable signal WE#, and a read enable signal RE#.

To increase the data transfer rate between a host and memory system 300, flash memory 230 may be required to increase its data input/output rate. Accordingly, to increase the data input/output rate, flash memory 230 may use a double data rate (DDR) scheme. In the DDR scheme, data is input/output in synchronization with the rising/falling edge of a data strobe signal. Herein, the data strobe signal is used as a reference clock to input/output data in a read/write operation of flash memory 230.

In the embodiment of FIG. 11, interface logic 231 further comprises data strobe logic 237. Data strobe logic 237 receives an external data strobe signal or provides a data strobe signal to an external device. Also, when receiving the above local read/write command, data strobe logic 237 may adjust the data strobe signal to a predetermined offset value. Flash memories 240, 260 and 270 have the same configuration as flash memory 230.

Figure 12:
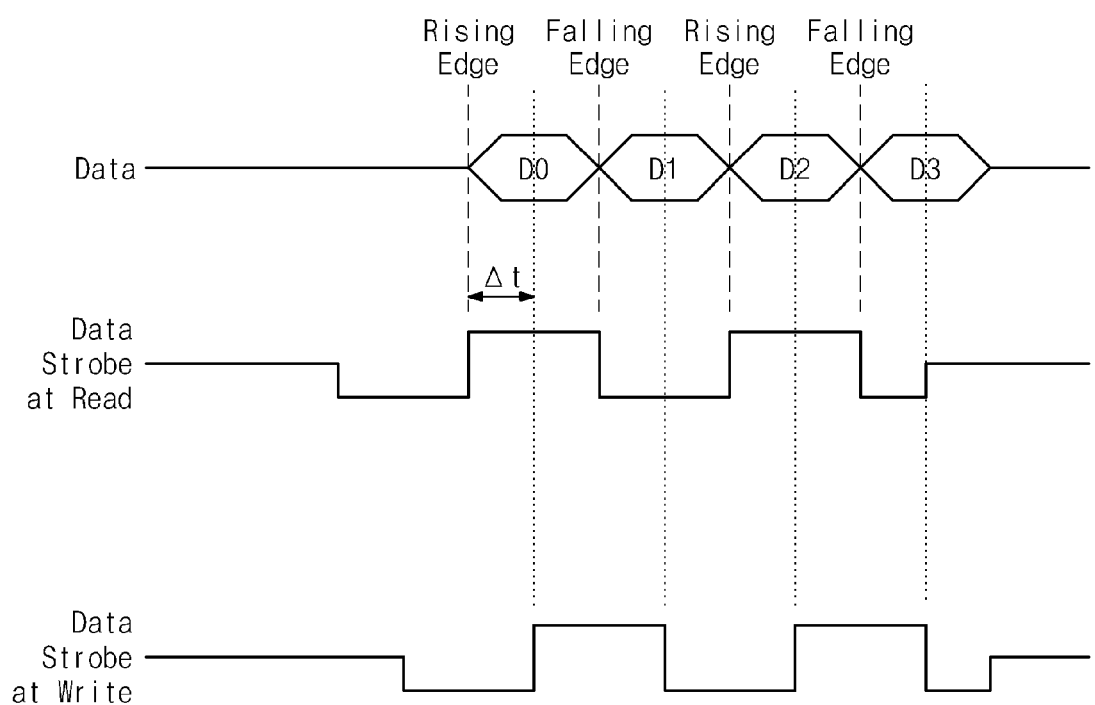
FIG. 12 is a timing diagram illustrating a data strobe signal according to an embodiment of the inventive concept.

FIG. 12 is a timing diagram illustrating a data strobe signal according to an embodiment of the inventive concept. More particularly, FIG. 12 illustrates the timing of a data signal according to a data strobe signal in a read/write operation.

Referring to FIG. 12, when a data strobe signal is toggled, data is output/input from/into flash memory 230. For example, where the data strobe signal changes from logic '0' (or logic 'low') to logic '1' (or logic 'high'), data is output/input from/into flash memory 230. As another example, where the data strobe signal changes from logic '1' (or logic 'high') to logic '0' (or logic 'low'), data is output/input from/into flash memory 230.

In a read operation of flash memory 230, a data strobe signal is output from flash memory 230 together with a data signal in synchronization with the edge of the data signal. In other words, the rising/falling edge of the data strobe signal synchronizes with the edge of the data signal. In a write operation of flash memory 230, a data strobe signal is input into flash memory 230 together with a data signal in synchronization with the center of the data signal. In other words, the rising/falling edge of the data strobe signal synchronizes with the center of the data signal. Accordingly, there is a time difference Δt between the data strobe signal in the read operation and the data strobe signal in the write operation.

In some embodiments, where data is directly transferred between flash memories 230 and 240, a read command, data and a read data strobe signal are provided to source flash memory 230. Also, a local write command, data shared through data bus 220, and a read strobe signal shared through data bus 220 are provided to target flash memory 240. Accordingly, target flash memory 240 performs a local write operation by adjusting the read strobe signal to a predetermined offset value through data strobe logic 237.

In some embodiments, where data is directly transferred between flash memories 230 and 240, a local read command, data and a write data strobe signal are provided to source flash memory 230. Also, a write command, data shared through data bus 220, and a write data strobe signal shared through data bus 220 are provided to target flash memory 240. Accordingly, source flash memory 230 performs a local read operation by adjusting the write strobe signal to a predetermined offset value through data strobe logic 237.

Figure 13:
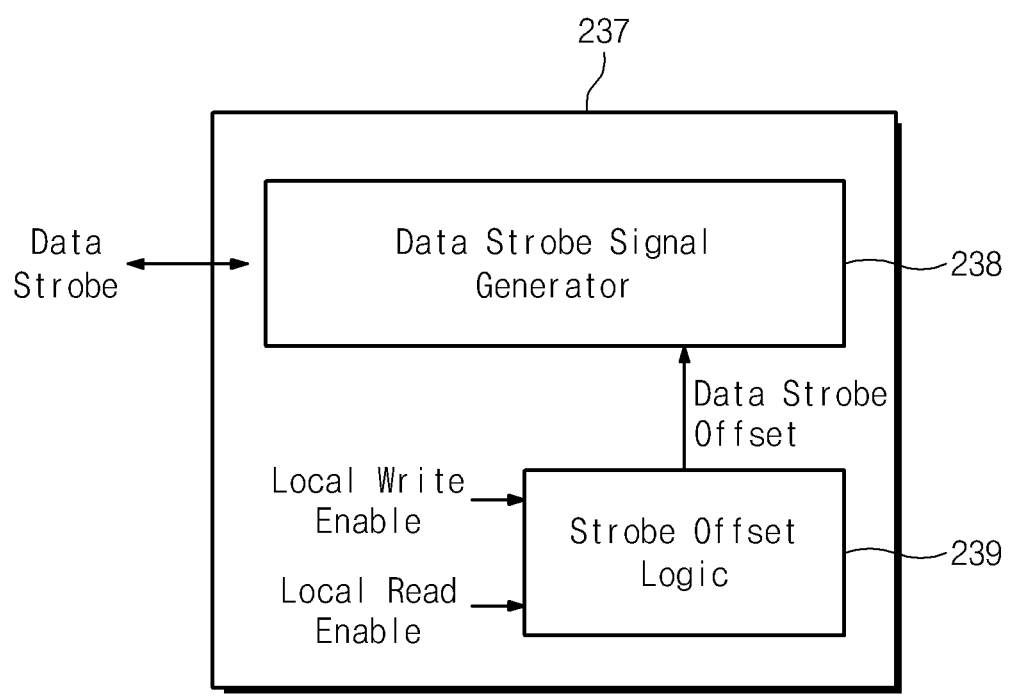
FIG. 13 is a block diagram of a data strobe logic according to an embodiment of the inventive concept.

FIG. 13 is a block diagram of data strobe logic 237 according to an embodiment of the inventive concept.

Referring to FIG. 13, data strobe logic 237 comprises a data strobe signal generator 238 and strobe offset logic 239. Data strobe signal generator 238 generates or receives a data strobe signal. For example, data strobe signal generator 238 generates and outputs a data strobe signal in synchronization with the data output from flash memory 230. Also, data strobe signal generator 238 receives and decodes a data strobe signal that is input in synchronization with the data input into flash memory 230.

According to a local write/read command, strobe offset logic 239 is enabled to adjust an input/output data strobe signal to a predetermined offset value. For example, a local write enable signal is provided to strobe offset logic 239 in response to the local write command, and strobe offset logic 239 delays the input read data strobe signal by a predetermined value. The delayed read data strobe signal has the same phase as the write data strobe signal. Also, a local read enable signal is provided to strobe offset logic 239 in response to the local read command, and strobe offset logic 239 delays the input write data strobe signal by a predetermined value. The delayed write data strobe signal can have the same phase as the read data strobe signal.

The offset value of strobe offset logic 239 can be a fixed value. As another example, the offset value of strobe offset logic 239 can be determined by testing the flash memory by memory controller 210.

In some embodiments, the data output from the source flash memory is shared through the data bus by the target flash memory connected to the same data bus. The data loaded on the data bus is directly provided to the target flash memory without transferring to the memory controller. At this point, under the control of the memory controller, the target flash memory performs a write operation on the data loaded on the data bus. In this manner, the operation for direct data transfer between the memory devices is performed by the operation necessary to manage the flash memory.

In some embodiments, the operation for the direct data transfer is performed during the wear-leveling operation of the flash memory. For example, the operation for direct data transfer between the flash memories may be generated when data is transferred from a high-wear memory block to a low-wear memory block. In some embodiments, the operation for the direct data transfer may is performed during a garbage collection operation that is to efficiently use the capacity of the flash memory. For example, if segmented data is stored in several pages in a distributed manner, the operation for direct data transfer between the flash memories can be performed when the segmented data is merged and stored in one memory block. These operations may be performed under the control of the memory controller.

In some embodiments, a memory controller controls operations for direct data transfer between memory devices by providing a command and a control signal to the memory devices according to an operation mode. For example, in response to a write control signal, the memory controller can provide a command and a control signal to a source memory device to read source data. As another example, in response to a read control signal, the memory controller can provide a command and a control signal to a target memory device to store source data. As another example, if an error occurs during the direct data transfer between the source/target memory devices, the memory controller resets the source/target memory devices and controls the source/target memory devices to again perform the data transfer operation. Also, the memory controller can correct an error in the source data through an ECC circuit and provide a command and a control signal to the target memory device to store the corrected data.

As another example, the memory controller can set and provide a data strobe signal for inputting/outputting data together with a command and a control signal.

Figure 14:
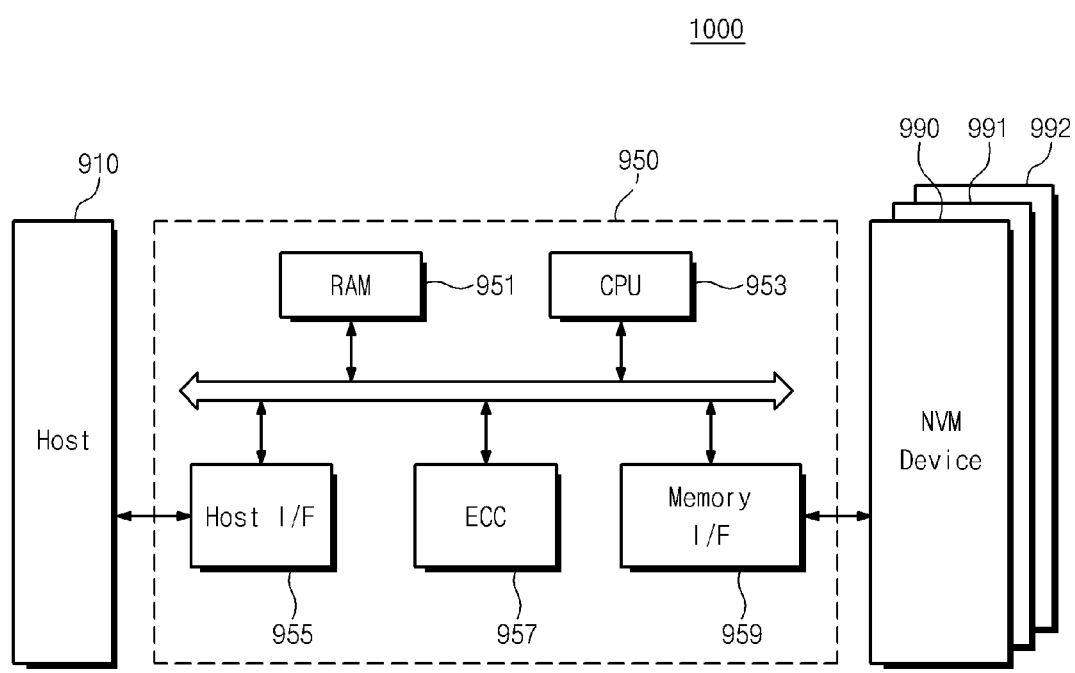
FIG. 14 is a block diagram of a memory system comprising a flash memory device according to an embodiment of the inventive concept.

FIG. 14 is a block diagram of a memory system comprising a flash memory device according to an embodiment of the inventive concept.

Referring to FIG. 14, a memory system 1000 comprises a memory controller 950 and NVM devices 990 through 992.

Memory controller 950 is connected to a host 910 and nonvolatile memory devices 990 through 992. Memory controller 950 is configured to access nonvolatile memory devices 990 through 992 in response to a request from host 910. For example, memory controller 950 is configured to control a read/write/erase operation of nonvolatile memory devices 990 through 992. Memory controller 950 is configured to control the direct data transfer between nonvolatile memory devices 990 through 992. Memory controller 950 provides an interface between host 910 and nonvolatile memory devices 990 through 992. Memory controller 950 drives firmware to control nonvolatile memory device 990.

Memory controller 950 comprises a random access memory (RAM) 951, a central processing unit (CPU) 953, a host interface (I/F) 955, an error correcting code (ECC) 957, and a memory interface (I/F) 959. RAM 951 can be used as a working memory of CPU 953. CPU 953 controls the overall operation of memory controller 950.

Host interface 955 implements a protocol for data exchange between host 910 and memory controller 950. For example, memory controller 950 may be configured to communicate with host 901 or other external devices through an interface protocol such as a universal serial bus (USB) protocol, a multimedia card (MMC) protocol, a peripheral component interconnection (PCI) protocol, a PCI-express (PCI-E) protocol, advanced technology attachment (ATA) protocol, serial ATA (SATA) protocol, small computer small interface (SCSI) protocol, enhanced small disk interface (ESDI) protocol, or an integrated drive electronics (IDE) protocol.

ECC 957 is configured to detect and correct errors in data read from nonvolatile memory device 990. Although ECC 957 is provided as a component of memory controller 950, it could alternatively be provided as a component of nonvolatile memory device 990. Memory interface 959 interfaces with nonvolatile memory devices 990 through 992. Although not illustrated in FIG. 14, memory system 1000 can further comprise a read-only memory (ROM) for storing code data for interfacing with host 910.

Memory controller 950 and nonvolatile memory devices 990 through 992 can be integrated into one semiconductor device to form a memory card. For example, in certain embodiments, memory controller 950 and nonvolatile memory devices 990 through 992 are integrated into one semiconductor device to constitute a memory card such as a personal computer memory card international association (PCMCIA) card, a compact flash (CF) card, a smart media card, a memory stick, a multimedia card (e.g., a MMC, RS-MMC, or MMC-micro card), a secure digital (SD) card (e.g., an SD, mini-SD, micro-SD, or SDHC card), or a universal flash storage (UFS) device.

As another example, memory system 1000 can be implemented in a solid state drive (SSD), computer, portable computer, ultra mobile personal computer (UMPC), work station, net-book, personal digital assistant (PDA), web tablet, wireless phone, mobile phone, digital camera, digital audio recorder, digital audio player, digital video recorder, digital video player, device capable of transmitting/receiving information in wireless environments, one of various electronic devices constituting a home network, one of various electronic devices constituting a computer network, one of various electronic devices constituting a telematics network, one of various components constituting a computer system, radio frequency identification (RFID) device, or embedded system.

In various embodiments, nonvolatile memory devices 990 through 992 or memory system 1000 can be mounted in different types of packages. Examples packages types for nonvolatile memory devices 990 through 992 or memory system 1000 include package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

As indicated by the foregoing, in certain embodiments of the inventive concept, a multi-chip memory system transfers data directly between memory devices, which can increase the system's data transfer rate.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A multi-chip memory system, comprising:
first and second nonvolatile memory devices;
a memory controller configured to control the first and second nonvolatile memory devices; and
a data bus configured to transfer data between the memory controller and the first and second nonvolatile memory devices,
wherein the memory controller controls the first and second nonvolatile memory devices simultaneously to perform a first operation to transfer data from the first nonvolatile memory device to the data bus, and a second operation to transfer the data from the data bus to the second nonvolatile memory device without the data passing through the memory controller, and
the memory controller simultaneously activates enable signals of the first and second nonvolatile memory devices during at least one of the first and second operations.

2. The multi-chip memory system of claim 1, wherein the first and second nonvolatile memory devices have shared access to the data on the data bus.

3. A multi-chip memory system, comprising:
first and second nonvolatile memory devices serially connected along a data bus to a memory controller that controls respective operations of the first and second nonvolatile memory devices; and
wherein the memory controller is configured during a direct data transfer operation to simultaneously activate and control the operation of the first and second nonvolatile memory devices to directly transfer data via the data bus from the first nonvolatile memory device to the second nonvolatile memory device without the data passing though the memory controller, and
the memory controller is further configured during the direct data transfer operation to generate and apply a local write command and a read control signal, serving as a clock signal, to the first and second nonvolatile memory devices.

4. The multi-chip memory system of claim 3, wherein the first nonvolatile memory device outputs data in response to the read control signal, and the second nonvolatile memory device stores the data in response to the read control signal upon receiving the local write command.

5. The multi-chip memory system of claim 1, wherein the memory controller comprises an error correcting circuit configured to detect an error in the data transferred between the first and second nonvolatile memory devices.

6. The multi-chip memory system of claim 5, wherein the data is re-transferred between the first and second nonvolatile memory devices in response to the error correcting circuit detecting an error in the data.

7. The multi-chip memory system of claim 5, wherein, in response to the error correcting circuit detecting an error in the data, the error is corrected to produce error corrected data, and the error corrected data is transmitted to the second nonvolatile memory device through the memory controller.

8. The multi-chip memory system of claim 3, wherein each of the first and second nonvolatile memory devices comprises a data strobe signal generator configured to receive a strobe signal to indicate data input, and to generate a strobe signal to indicate data output;
wherein the data strobe signal generator adjusts a phase of the data strobe signal to a predetermined offset value during direct data transfer between the first and second nonvolatile memory devices.

9. The multi-chip memory system of claim 8, wherein the second nonvolatile memory device receives the local write command and, upon receiving the local write command, adjusts a received read data strobe signal input to have a same phase as a write data strobe signal, and stores data according to the adjusted read data strobe signal.

10. A method of performing data transfer in a multi-chip memory system comprising first and second nonvolatile memory devices serially connected to a memory controller along a data bus, the method comprising:
(a) controlling the first nonvolatile memory device to output data to the data bus; and simultaneously,
(b) controlling the second nonvolatile memory device to receive the data output by the first nonvolatile memory device directly from the data bus without passing through the memory controller.

11. The method of claim 10, wherein simultaneously controlling the first and second nonvolatile memory devices comprises generating a local write command and a read control signal in the memory controller and applying the local write command and the read control signal to the first and second nonvolatile memory device.

12. The method of claim 10, further comprising detecting an error in the data output from the first nonvolatile memory device.

13. The method of claim 12, further comprising:
upon detecting an error in the data output from the first nonvolatile memory device, controlling the first nonvolatile memory device to output data to the data bus, by repeating (a) and (b).

14. The method of claim 12, further comprising:
upon detecting an error in the data output from the first nonvolatile memory device, correcting the error to produce corrected data, and storing the corrected data in the second nonvolatile memory device.

15. A method of performing data transfer in a multi-chip memory system comprising first and second nonvolatile memory devices serially connected to a memory controller via a data bus, the method comprising:
- controlling the first nonvolatile memory device to output data to the data bus; and simultaneously,
- controlling the second nonvolatile memory device to receive the data output by the first nonvolatile memory device directly from the data bus without passing through the memory controller,
- wherein the first nonvolatile memory device comprises interface logic that receives at least one control signal from the memory controller and in response generates a data strobe signal that defines a double data rate (DDR) mode of data transfer between the first nonvolatile memory device and the memory controller.

16. The method of claim 15, further comprising adjusting a phase of the data strobe signal to a predetermined offset value by operation of the interface logic of the first nonvolatile memory device.

17. The multi-chip memory system of claim 1, wherein the first and second nonvolatile memory devices are NAND flash memory devices.

18. The multi-chip memory system of claim 3, wherein the first and second nonvolatile memory devices are NAND flash memory devices.

19. The method of claim 10, wherein the first and second nonvolatile memory devices are NAND flash memory devices.

20. The method of claim 15, wherein the first and second nonvolatile memory devices are NAND flash memory devices.

* * * * *